(12) United States Patent
Ruedisueli et al.

(10) Patent No.: US 8,596,673 B2
(45) Date of Patent: Dec. 3, 2013

(54) ANTI-EJECTION INFLATABLE VEHICLE OCCUPANT PROTECTION DEVICE

(75) Inventors: Kevin L. Ruedisueli, Oxford, MI (US); Jay D. Blackson, Dryden, MI (US); Masood A. Mohammad, Rochester, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 41 days.

(21) Appl. No.: 13/109,285

(22) Filed: May 17, 2011

(65) Prior Publication Data

US 2012/0193897 A1    Aug. 2, 2012

Related U.S. Application Data

(60) Provisional application No. 61/437,883, filed on Jan. 31, 2011.

(51) Int. Cl.
*B60R 21/21* (2011.01)

(52) U.S. Cl.
USPC .................................. 280/730.2; 280/742.2

(58) Field of Classification Search
USPC .......................................... 280/730.2, 743.2
See application file for complete search history.

(56) References Cited

U.S. PATENT DOCUMENTS

| | | | | |
|---|---|---|---|---|
| 5,324,072 A * | 6/1994 | Olson et al. | ................ | 280/730.2 |
| 5,722,685 A * | 3/1998 | Eyrainer | .................... | 280/730.2 |
| 5,730,464 A * | 3/1998 | Hill | ............................ | 280/743.2 |
| 6,135,497 A * | 10/2000 | Sutherland et al. | ........... | 280/749 |
| 6,273,458 B1 * | 8/2001 | Steffens et al. | ............ | 280/730.2 |
| 6,375,216 B1 * | 4/2002 | Eschbach | .................. | 280/730.1 |
| 6,431,588 B1 * | 8/2002 | Bayley et al. | .............. | 280/730.2 |
| 6,464,250 B1 * | 10/2002 | Faigle et al. | ................ | 280/730.2 |
| 6,709,008 B2 * | 3/2004 | McGee et al. | ................ | 280/729 |
| 6,733,035 B2 * | 5/2004 | Thomas et al. | ............ | 280/730.2 |
| 6,773,031 B2 * | 8/2004 | Haig | ............................ | 280/749 |
| 6,945,558 B2 * | 9/2005 | Hall et al. | .................. | 280/730.2 |
| 7,044,500 B2 * | 5/2006 | Kalandek et al. | .......... | 280/730.2 |

(Continued)

FOREIGN PATENT DOCUMENTS

| | | |
|---|---|---|
| DE | 10032106 A1 | 1/2002 |
| DE | 102006036075 A1 | 5/2007 |
| DE | 102007025986 A1 | 12/2008 |

*Primary Examiner* — Nicole Verley
(74) *Attorney, Agent, or Firm* — Tarolli, Sundheim, Covell & Tummino LLP (57) ABSTRACT

An apparatus (10) for helping to protect an occupant of a vehicle (12) that has a side structure (16) and a window opening (28) includes an inflatable vehicle occupant protection device (14) inflatable to a deployed condition in which the protection device is positioned between the side structure (16) and the vehicle occupant and covers at least a portion of the window opening (28). The protection device (14) when in the deployed condition has a first edge portion (70) connected to an adjacent portion of the vehicle and an opposite second edge portion (76) that is free from connections to vehicle portions adjacent the second edge portion. At least one tether (100) has a first end connected to the vehicle proximate to the first end portion (70) of the protection device (14) and an opposite second end connected to the second edge portion (76) of the protection device. The at least one tether (100) maintains the second edge portion (76) of the protection device (14) in the deployed condition and resists outboard movement of the second edge portion through the window opening (28) in response to occupant movement toward the window opening to restrain the occupant from ejection through the window opening.

21 Claims, 8 Drawing Sheets

(56) References Cited

U.S. PATENT DOCUMENTS

| | | | |
|---|---|---|---|
| 7,125,039 B2 * | 10/2006 | Bossecker et al. | 280/730.2 |
| 7,165,783 B2 * | 1/2007 | Karlbauer et al. | 280/730.2 |
| 7,178,827 B2 | 2/2007 | Wu et al. | |
| 7,350,804 B2 * | 4/2008 | Bakhsh et al. | 280/730.2 |
| 7,413,215 B2 * | 8/2008 | Weston et al. | 280/730.2 |
| 7,513,523 B2 * | 4/2009 | Bayley et al. | 280/730.2 |
| 7,581,751 B2 * | 9/2009 | Ochiai et al. | 280/730.2 |
| 7,628,421 B2 * | 12/2009 | Wright | 280/730.2 |
| 7,661,702 B2 * | 2/2010 | Ochiai et al. | 280/730.2 |
| 7,712,773 B2 * | 5/2010 | Walston | 280/730.2 |
| 7,735,863 B2 * | 6/2010 | Walston et al. | 280/749 |
| 7,762,579 B2 | 7/2010 | Garner | |
| 7,806,432 B2 | 10/2010 | Nelson et al. | |
| 7,823,922 B2 * | 11/2010 | Mitchell et al. | 280/743.2 |
| 7,828,322 B2 * | 11/2010 | Breuninger et al. | 280/730.2 |
| 7,942,444 B2 * | 5/2011 | Steinbach et al. | 280/743.2 |
| 2001/0033073 A1 * | 10/2001 | Hammond et al. | 280/730.2 |
| 2002/0175502 A1 * | 11/2002 | Tesch et al. | 280/730.2 |
| 2004/0164529 A1 * | 8/2004 | Yoshida | 280/730.2 |
| 2010/0264630 A1 | 10/2010 | Walston | |
| 2010/0276916 A1 * | 11/2010 | Breuninger et al. | 280/730.2 |
| 2011/0272928 A1 * | 11/2011 | Czach et al. | 280/730.2 |

* cited by examiner

ANTI-EJECTION INFLATABLE VEHICLE OCCUPANT PROTECTION DEVICE

RELATED APPLICATIONS

This application claims the benefit U.S. Provisional Application Ser. No. 61/437,883, filed on Jan. 31, 2011.

FIELD OF THE INVENTION

The present invention relates to an apparatus for helping to protect an occupant of a vehicle. In particular, the present invention relates to an inflatable vehicle occupant protection device for helping to protect a vehicle occupant. More particularly, the present invention relates to an inflatable vehicle occupant protection device for helping to protect an occupant and for helping to prevent occupant ejection through a driver or passenger side window opening.

BACKGROUND OF THE INVENTION

It is known to inflate an inflatable vehicle occupant protection device to help protect a vehicle occupant. Examples of inflatable vehicle occupant protection devices include driver and passenger frontal air bags, side impact air bags, inflatable curtains, inflatable seat belts, and inflatable knee bolsters.

An inflatable curtain is inflatable in response to the occurrence of an event for which inflation of the inflatable curtain is desired, such as a side impact to the vehicle, a vehicle rollover, or both. The inflatable curtain has a deflated and stowed condition in which the curtain is positioned in or adjacent a roof rail that extends along an outboard edge of a vehicle roof. The inflatable curtain is inflatable away from the vehicle roof between the side structure of the vehicle and a vehicle occupant. In the inflated and deployed condition, the inflatable curtain may partially, substantially, or completely cover a side window opening. In one known construction, an inflatable curtain is inflated by inflation fluid directed from an inflator to the inflatable curtain directly, via a fabric diffuser, or via a metal, plastic, or fabric fill tube.

A side air bag may be desirable in a vehicle where roof rail space is insufficient to support an inflatable curtain. One particular type of side air bag is a door mounted side air bag. The door mounted side air bag is inflatable in response to the occurrence of an event for which inflation of the air bag is desired, such as a side impact to the vehicle, a vehicle rollover, or both. The door mounted side air bag is inflatable between the door and a vehicle occupant positioned in an adjacent vehicle seat. Such door mounted side air bags are inflatable from a stowed position in the vehicle door to a position extending inboard and upward from the vehicle door. In the inflated and deployed condition, the door mounted side airbag may partially, substantially, or completely cover a side window opening.

SUMMARY OF THE INVENTION

The present invention relates to the addition of tethers to a door mounted or roof rail mounted curtain air bag module. The invention incorporates one or more tethers that connect the top of the inflated door mounted air bag and bottom of the module or vehicle door. The invention also incorporates one or more tethers that connect the bottom of the inflated roof rail mounted curtain air bag and the roof rail or roof rail mounted module. The tethers limit the outward travel of the airbag. The present invention advantageously can fulfill certain government safety requirements, such as the National Highway Traffic Safety Administration (NHTSA) Federal Motor Vehicle Safety Standard FMVSS 226 Ejection Mitigation requirement.

One particular implementation for the present invention is in vehicles with limited package space in the headliner where a traditional curtain airbag is packaged. For example, convertibles that do not have a roof to mount to or vehicles with both hard top and convertible roofs that share a common module design are both potential candidates for the door mounted air bag of the present invention.

According to one embodiment, the present invention relates to an apparatus for helping to protect an occupant of a vehicle that has a side structure and a window opening includes an inflatable vehicle occupant protection device inflatable to a deployed condition in which the protection device is positioned between the side structure and the vehicle occupant and covers at least a portion of the window opening. The protection device when in the deployed condition has a first edge portion connected to an adjacent portion of the vehicle and an opposite second edge portion that is free from connections to vehicle portions adjacent the second edge portion. At least one tether has a first end connected to the vehicle proximate to the first end portion of the protection device and an opposite second end connected to the second edge portion of the protection device. The at least one tether maintains the second edge portion of the protection device in the deployed condition and resists outboard movement of the second edge portion through the window opening in response to occupant movement toward the window opening to restrain the occupant from ejection through the window opening.

The present invention also relates to an apparatus for helping to protect an occupant of a vehicle that has a side structure and a door that helps define a window opening. The apparatus includes an air bag that is stored in the door and that is inflatable upward to a deployed condition in which the air bag is positioned between the side structure and the vehicle occupant and covers at least a portion of the window opening. The air bag has a lower edge portion connected to the vehicle door and an opposite upper edge portion. At least one tether has a first end connected to the door proximate to and inboard of the lower edge portion of the air bag. An opposite second end of the at least one tether is connected to the upper edge portion of the air bag. The at least one tether extends inboard of an inboard facing panel of the air bag. The at least one tether maintains the upper edge portion of the air bag in the deployed condition and resists outboard movement of the upper end portion through the window opening in response to the occupant movement toward the window opening to restrain the occupant from ejection through the window opening.

The present invention further relates to an apparatus for helping to protect an occupant of a vehicle that has a side structure, a roof, and a window opening. The apparatus includes an inflatable curtain that is stored adjacent the roof and that is inflatable downward to a deployed condition in which the inflatable curtain is positioned between the side structure and the vehicle occupant, and covers at least a portion of the window opening. The inflatable curtain has an upper edge portion connected to the vehicle roof and an opposite lower edge portion. At least one tether has a first end connected to the roof inboard of the upper edge portion of the inflatable curtain, and an opposite second end connected to the lower edge portion of the inflatable curtain. The at least one tether extends inboard of an inboard facing panel of the inflatable curtain. The at least one tether maintains the lower edge portion of the inflatable curtain in the deployed condition and resists outboard movement of the lower edge portion through the window opening in response to the occupant movement toward the window opening to restrain the occupant from ejection through the window opening.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIGS. 1-3D are schematic views of an apparatus for helping protect an occupant of a vehicle, according to a first embodiment of the present invention;

DESCRIPTION OF EMBODIMENTS

Figure 1:
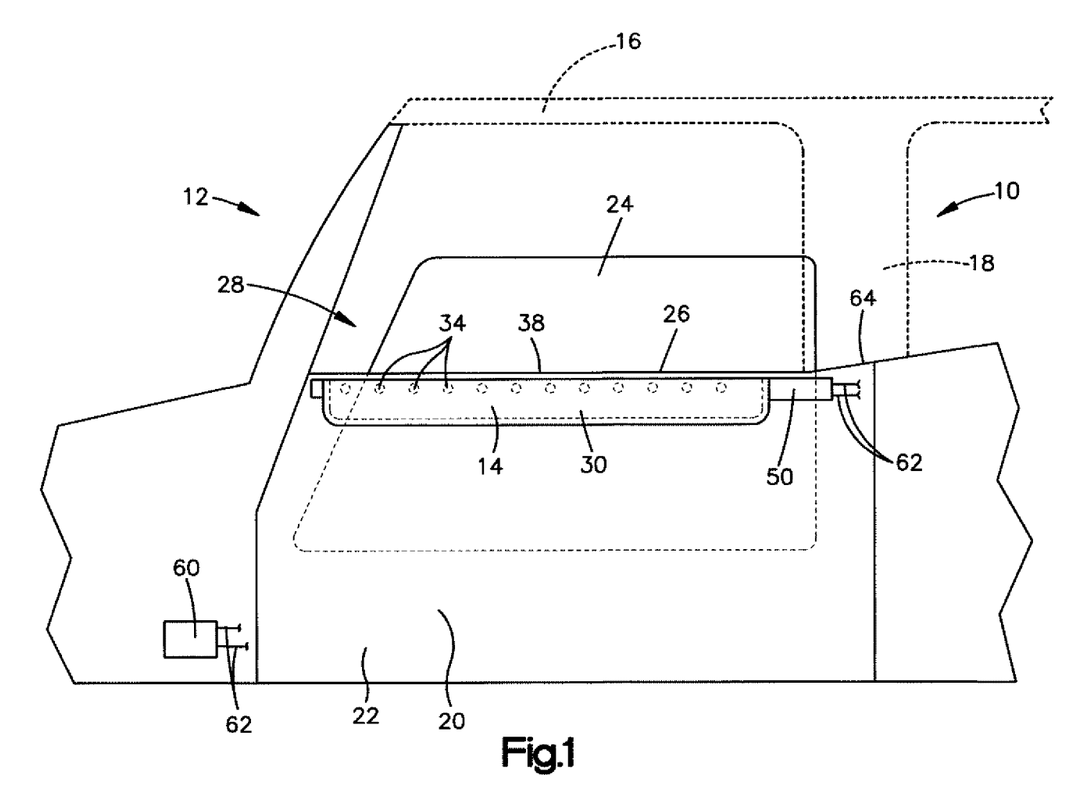
Figure 2:
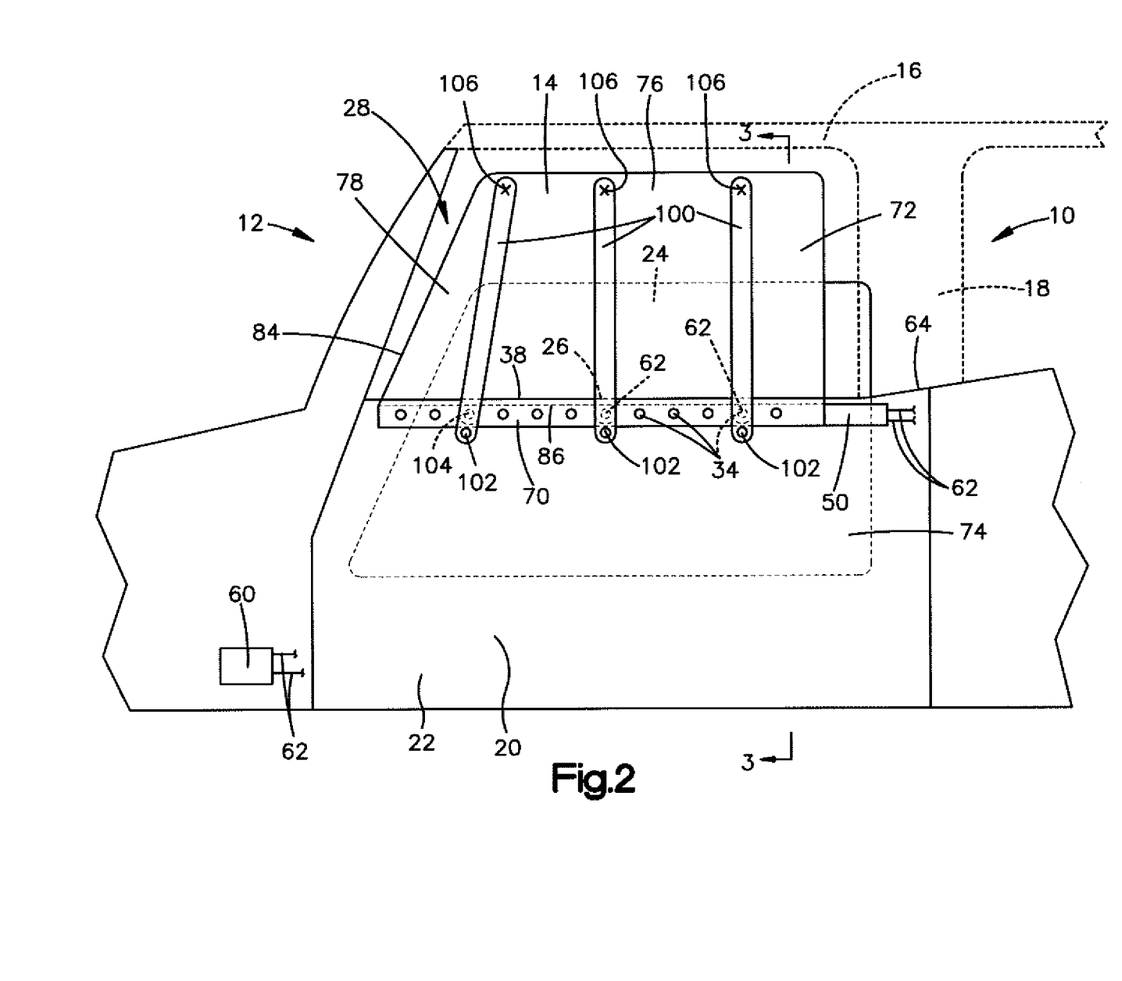

A first embodiment of the present invention is illustrated in FIGS. 1-3B. According to the first embodiment, an apparatus 10 is for helping to protect an occupant (not shown) of a vehicle 12. The apparatus 10 may be incorporated in a vehicle 12 having a variety of constructions. The apparatus 10, however, may be especially well-suited for use in a vehicle 12 that has a roof that is movable or removable, such as a convertible automobile, because such vehicles often lack structure suitable for supporting the apparatus in the area of the vehicle roof. The vehicle 12 illustrated in FIGS. 1-3B is a two-door convertible automobile. To illustrate that the apparatus 10 is suitable for use in vehicles other than a convertible vehicle, FIGS. 1-2 illustrate schematically a roof 16 and a B-pillar 18 in dashed lines.

Figure 3A:
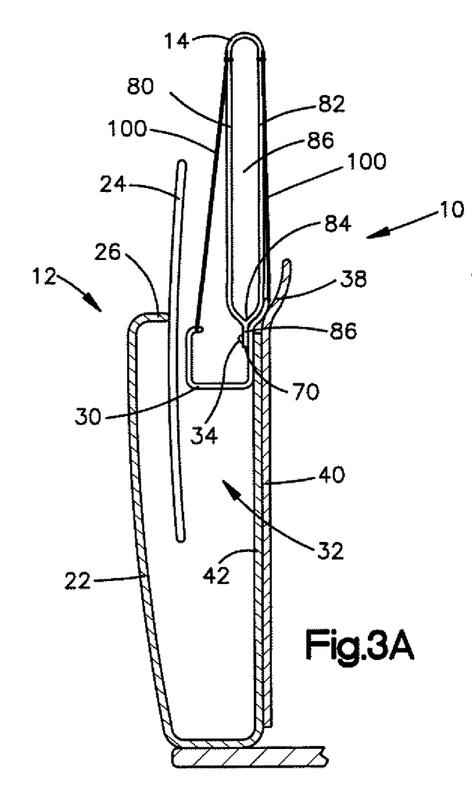
Figure 3B:
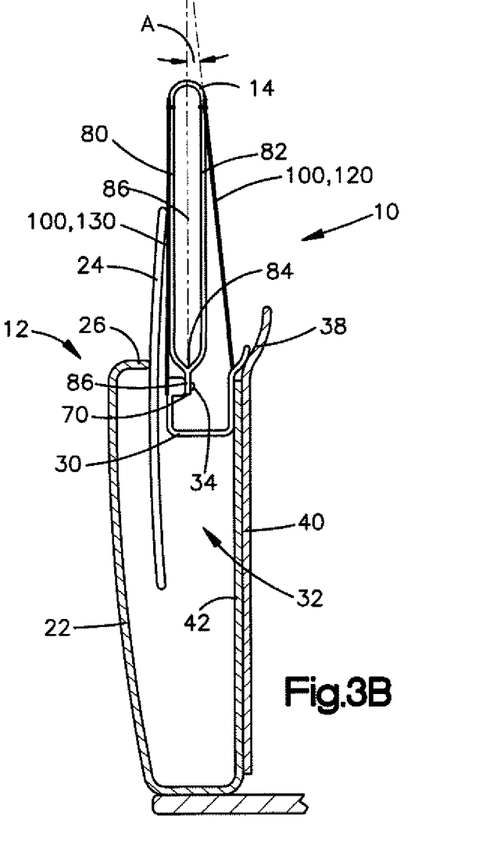

The apparatus 10 is actuatable from a stored position, illustrated in FIG. 1, to a deployed position, illustrated in FIGS. 2-3B. As shown in FIGS. 1 and 2, the apparatus 10 includes a vehicle occupant protection device, in the form of a side air bag 14. An inflator 50 is actuatable to inflate the air bag 14 and cause the air bag to deploy from the stored condition of FIG. 1 to the deployed condition of FIGS. 2-3B. The air bag 14 is mounted in the side structure 20 of the vehicle 12. In the embodiments illustrated in FIGS. 1-3B, the air bag 14 is illustrated as being mounted in a side door 22 of the vehicle 12. The air bag 14 could, however, be mounted in an alternative location. For example, in the two-door convertible vehicle 12 of FIGS. 1-3B, the apparatus 10 could be wholly or partially mounted in the side structure 20 rearward of the side door 22 adjacent a rear seat (not shown) of the vehicle. As another example, the apparatus 10 could be wholly or partially mounted in a vehicle seat (not shown). As a further example, the apparatus 10 could be wholly or partially mounted in a B-pillar (illustrated generally in dashed lines at 18) of the vehicle 12.

The side door 22 includes a side window 24 that is operable between an opened or "down" position and a closed or "up" position. In the embodiment illustrated in FIGS. 1-3B, the window 24 is illustrated at a position between the opened and closed positions. The side door 22 also includes a window opening 28 into which the window 24 may extend. The window opening 28 is partially defined by a sill 26 which forms a part of the vehicle side structure 20. The sill 26 helps define a lower edge of the window opening 28. The sill 26 may extend rearward beyond the rear extent of the side door 22 to a position adjacent the rear seat of the vehicle 12. The sill 26 thus helps define the upper extent of the side structure 20 adjacent an occupant (not shown) of the vehicle 12. This portion may also be referred to as a belt line 38 of the vehicle 12.

The apparatus 10 of the present invention may be incorporated in side doors 22 having a variety of configurations. Referring to FIG. 1, when the apparatus 10 is in the stored position, the air bag 14 is stored in a housing 30 positioned in an interior portion 32 of the side door 22. The various side door configurations help determine the configuration of the apparatus, including the housing 30 and the air bag 14. The air bag 14 may be placed in the stored position in any desired manner, such as by folding the air bag, rolling the air bag, or by a combination of folding and rolling the air bag.

When the apparatus 10 is in the stored position, the housing 30 and the air bag 14 have a generally elongated configuration extending adjacent or near the sill 26 or belt line 38. The housing 30 and a lower edge portion 70 of the air bag 14 are connected to the side door 22 by suitable fastening means 34, such as screws, bolts, rivets, etc. Referring to FIG. 3A, a door panel 40 overlies an inner panel 42 of the side door 22 and may help to conceal the air bag 14 and housing 30 in the interior 32 of the side door.

The first and second panels 80 and 82 are preferably constructed of a fabric, such as nylon, that may be coated with a gas impermeable material, such as urethane or silicone. The air bag 14 thus may have a substantially gas-tight construction. Other materials, such as elastomers, plastic films, or combinations thereof, may also be used to construct the air bag 14. The first and second panels 80 and 82 may also be formed of single or multi-layered sheets of material.

Referring to FIG. 2, the air bag 14 may have a generally rectangular or trapezoidal configuration. The air bag 14 could, however, have an alternative configuration, such as those illustrated in the embodiments of FIGS. 4-7, due to factors such as the architecture of the vehicle and the desired area of coverage. The lower edge portion 70 of the air bag 14 is connected to the side door 22 adjacent or near the belt line 38. A rear edge portion 72 of the air bag 14 extends upward from a rear end of the lower edge 70 and is positioned near a rear portion 74 of the side door 22. An upper edge portion 76 of the air bag 14 extends from an upper end of the rear edge portion 72 to an upper end of a forward edge portion 78 of the air bag 14.

Referring to FIG. 3A, the air bag 14 includes first and second panels 80 and 82 that are arranged in an overlying manner. Overlapping portions of the first and second panels 80 and 82 are interconnected by means, such as stitching, along at least a portion of a perimeter of the air bag 14, forming a perimeter connection 84. The panels 80 and 82 when interconnected via the perimeter connection 84 define an inflatable volume 86 of the air bag. Alternative means, such as ultrasonic welding, heat bonding, or adhesive bonding, could also be used to interconnect the first and second panels 80 and 82.

In addition to the perimeter connection 84, the first and second panels 80 and 82 could also be interconnected at desired locations within the perimeter to form inflatable chambers of the air bag 14 (not shown in FIGS. 1-3B; but see, e.g., the embodiments of FIGS. 5-8). These interconnected portions of the first and second panels 80 and 82 would thereby form non-inflatable portions of the air bag 14. Additionally, a lower connection 86 may be configured such that the lower edge portion 70 of the air bag 14 is non-inflatable in order to facilitate connection of the lower edge portion to the side door 22 via the fastening means 34.

In the embodiment illustrated in FIGS. 1-3B, the air bag 14 is formed from a sheet of material that is folded over to form the overlying first and second panels 80 and 82. The sheet of material being folded over along the upper edge portion 76, the perimeter connection 84 thus may extend along the front edge portion 78, the rear edge portion 72, and the lower edge portion 70. Those skilled in the art, however, will appreciate that the air bag 14 could have alternative constructions. For example, the first and second panels 112 and 114 could be formed from separate sheets of material arranged in an overlying manner and secured together by stitching, ultrasonic welding, heat bonding, or adhesive bonding that extends around the entire perimeter of the panels to form the air bag 14. As a further alternative, the air bag 14 could be woven as a single piece of material that is free from stitched peripheries.

The apparatus 10 includes an inflation fluid source in the form of an inflator 50 for inflating the air bag 14. The inflator 50 contains a stored quantity of pressurized inflation fluid (not shown) in the form of a gas to inflate the air bag 14. The inflator 50 alternatively could contain a combination of pressurized inflation fluid and ignitable material for heating the inflation fluid, or could be a pyrotechnic inflator that uses the combustion of gas-generating material to generate inflation fluid. As a further alternative, the inflator 50 could be of any suitable type or construction for supplying a medium for inflating the air bag 14.

The vehicle 12 also includes a controller 60 (shown schematically in FIGS. 1 and 2) that is operative to actuate the inflator 50 in response to the occurrence of an event for which occupant protection may be desired, such as a vehicle impact or rollover. Upon the occurrence of such an event, the controller 60 provides an electrical signal over lead wires 62 to the inflator 50. The electrical signal causes the inflator 50 to be actuated in a known manner. The inflator 50 discharges pressurized inflation fluid into the air bag 14.

The apparatus 10 may be configured to direct the inflation fluid into the air bag 14 in a variety of manners. For example, the inflator 50 may be connected directly to the air bag 14, as shown in the embodiment of FIGS. 1-3B, and thus may direct inflation fluid directly into the air bag. As another example, the inflator 50 may be connected to a fabric diffuser or fill tube (not shown) that extends into the inflatable volume 86 of the air bag 14 and thus may direct inflation fluid into the air bag via this conduit. As a further example, the inflator 50 may be connected to a rigid diffuser or fill tube (not shown), such as a plastic or metal fill tube that extends into the inflatable volume 86 of the air bag 14, and thus may direct inflation fluid into the air bag via this conduit.

The air bag 14 inflates and deploys under the pressure of inflation fluid. The housing 30 opens under the force of the deploying air bag 14 and the air bag deploys in a generally upward direction into the position illustrated in FIGS. 2 and 3. The air bag 14, when deployed, extends along the side door 22 of the vehicle 12 and is positioned between the side window 24/window opening 28 and any occupant (not shown) of the vehicle. As illustrated in FIGS. 2-3B, when the air bag 14 is in the deployed condition, the air bag extends generally vertically above the belt line 38 and is positioned overlying the window opening 28. The air bag 14, when deployed, can help protect a vehicle occupant in the event of a vehicle rollover or a side impact to the vehicle 12. The air bag 14, when deployed, can also help to absorb the energy of impacts with the air bag and helps to distribute the impact energy over a large area of the air bag.

As a feature of the present invention, the air bag 14 includes anti-ejection means in the form of straps or tethers 100 that help to maintain the air bag 14 positioned adjacent and covering the window opening 28. The tethers 100 also help to resist outboard movement of the deployed air bag 14 through the window opening 28. To achieve this purpose, the tethers 100 are configured to become tensioned upon deployment of the air bag 14 by selecting the length of the tethers to be shorter than the inflated height of the air bag. Thus, the lengths of the tethers 100 are shorter than the distance the portions of the air bag 14 to which the tethers are connected would travel if unrestricted by the tethers. This ensures that the tethers 100 become taut and tensioned when the air bag 14 is in the inflated, deployed, and pressurized condition. When the air bag 14 reaches the inflated, deployed, and pressurized condition, it becomes somewhat rigid and, due to this, tensions the tethers 100, which in response help resist movement of the air bag 14 and help maintain the air bag in the deployed position. The air bag 14, in combination with the tethers 100, can thus help prevent an occupant or a portion of an occupant from being ejected or otherwise passing through the window opening 28.

As shown in FIGS. 3A and 3B, the tethers 100 may include both inboard and outboard tethers. Inboard tethers 120 help prevent the air bag 14 from moving in an outboard direction while inflated and pressurized. The inboard tethers 120 thus assist in providing anti-ejection qualities to the air bag 14. Outboard tethers 130 help prevent the air bag 14 from moving in an inboard direction while inflated and pressurized. The outboard tethers thus assist in maintaining the position of the air bag 14 adjacent to and covering the window opening 28. In one embodiment, the outboard tethers 130 could be omitted, leaving only the inboard tethers 120.

In one particular door mounted embodiment, the tethers 100 are mounted to the door sheet metal below the housing 30 and sewn to the top of the bag. This sheet metal connection is shown schematically at 102 in FIG. 2. Alternatively, the tethers 100 could be connected to the housing 30, which is shown schematically in dashed lines at 104 in FIG. 2. The sewn connections are shown schematically at 106. The length of the tethers 100 is shorter than the inflated height of the air bag 14 as measured vertically with respect to the vehicle 12. This creates tension in the tethers 100 when the air bag 14 is in the inflated, deployed, and pressurized condition. The tension in the tethers 100 helps limit or resist the lateral movement of the air bag 14. The amount of tension in the tethers 100 can be tailored or adjusted by selecting the appropriate difference between the length of the tethers 100 and the inflated height of the air bag 14.

Also, the tensioned tethers 100 tension the air bag 14 at angles with respect to the generally vertically deployed air bag. This angle can be selected through the configuration of the apparatus 10, which is illustrated in the varied configurations of FIGS. 3A and 3B. The apparatus 10 of FIG. 3B differs from that of FIG. 3A only in that the lateral position of the air bag 14 is shifted outboard in order to increase the angle at which the inboard tether 120 applies tension to the air bag. This angle of the inboard tether 120 is illustrated generally at "A" in FIG. 3B. Comparing the apparatus 10 of FIG. 3A to that of FIG. 3B, it will be appreciated that the increased angle A of FIG. 3B correspondingly increases the magnitude of the component force of the inboard tether 120 tension that acts in the direction of resistance to outboard movement of the air bag. Thus, for a tension of a given magnitude applied to the inboard tether 120, the component of that tension that offers resistance to outboard movement of the air bag 14 will vary proportionally with the angle A.

Testing has shown that the tension in the tethers 100 will limit the travel of the air bag 14 outside the window. Advantageously, the tethers 100 of the present invention can help to minimize the need for the air bag 14 to overlap with vehicle structure (such as the roof rail 16, A-pillar 17, and B-pillar 18) in order to limit outboard air bag travel. This can help to reduce the size of the bag 14 and, consequently, reduce the size of the inflator 50 required to inflate the air bag. Since the air bag 14 is not relying on overlapping the vehicle structure to reduce excursion performance, bag trajectory is not as important a factor as it otherwise might be. This can be a significant benefit in vehicles with aggressive side window angles such as sports cars. The overlap of the air bag 14 to the trim can also be minimized as the tethers 100 will also help to absorb the load from impacts with the air bag. This can further reduce the reliance on trim overlap or tethers that extend laterally within the air bag 14 (and laterally with respect to the vehicle) to improve ejection performance.

Additionally, according to the present invention, in the embodiment of FIGS. 1-3B, the tethers 100 being connected to the air bag 14 along the edge portion of the bag opposite the location on the vehicle 12 were the bag and the opposite end of the tether are connected helps to enhance the anti-ejection properties of the apparatus 10. This is illustrated in FIGS. 3C and 3D.

Figure 3C:
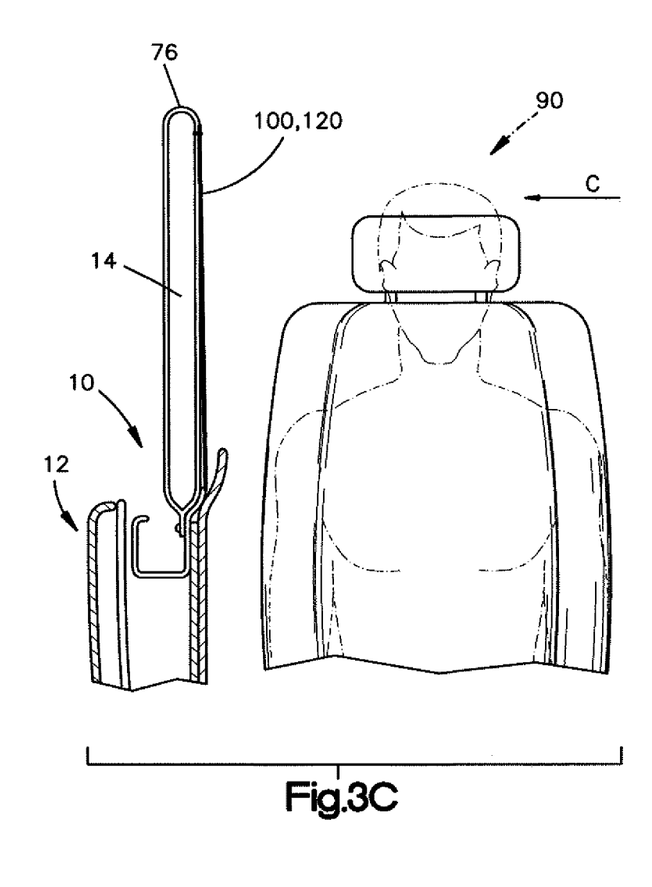
Figure 3D:
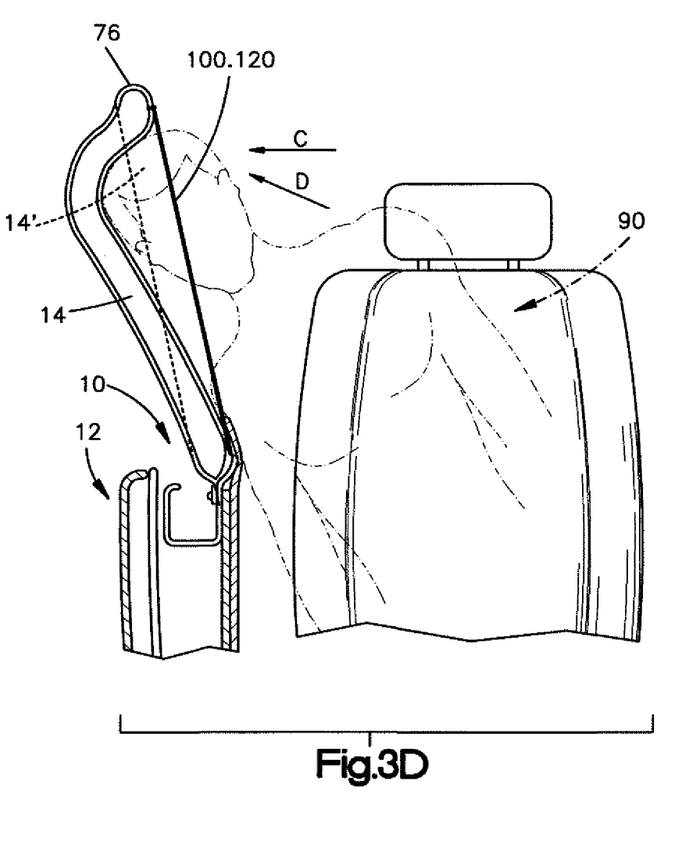

Referring to FIGS. 3C and 3D, the tethers 100, particularly the inboard tethers 120, are being connected to the upper edge portion 76 of the air bag 14 while the opposite ends of the tethers and the lower edge portion 70 of the bag are connected to the vehicle 12. Due to this configuration, when an occupant 90 moves in the outboard direction toward the air bag 14, as indicated generally at C in FIG. 3C, the occupant will impact the bag below the upper edge 76. As the occupant 90 urges the air bag 14 in the outboard direction, as shown in FIG. 3D, the tethers 100 will oppose bag movement in this direction.

As the occupant 90 moves outboard of the vehicle 12, the occupant trajectory can gain an upward component, which is illustrated generally ad D in FIG. 3D, which is acute with respect to the direction of the tension applied by the tethers 100. The tethers 100 thus oppose the outboard movement of the occupant 90. As a result, the portion of the air bag 14 above the location where the occupant 90 strikes the bag will be restricted from outboard movement by the tethers 100. Also, the tethers 100 positioned fore and aft of the occupant 90 will tend to draw the air bag 14 around the occupant, and the air bag 14 will thus envelope the occupant, as shown in FIG. 3D. To further illustrate this point, the portion(s) of the air bag 14 illustrated in dashed lines at 14' indicates those fore and/or aft portions of the bag that help envelope the occupant 90 due to the tethers 100 restricting air bag movement. Those skilled in the art will thus appreciate that the tethers 100 will maintain the inboard positions of those portions of the air bag 14 positioned above, fore, and aft of the occupant 90. The air bag 14 and tethers 100, in combination, thus act to restrict outboard movement and prevent ejection of the occupant 90.

Figure 4A:
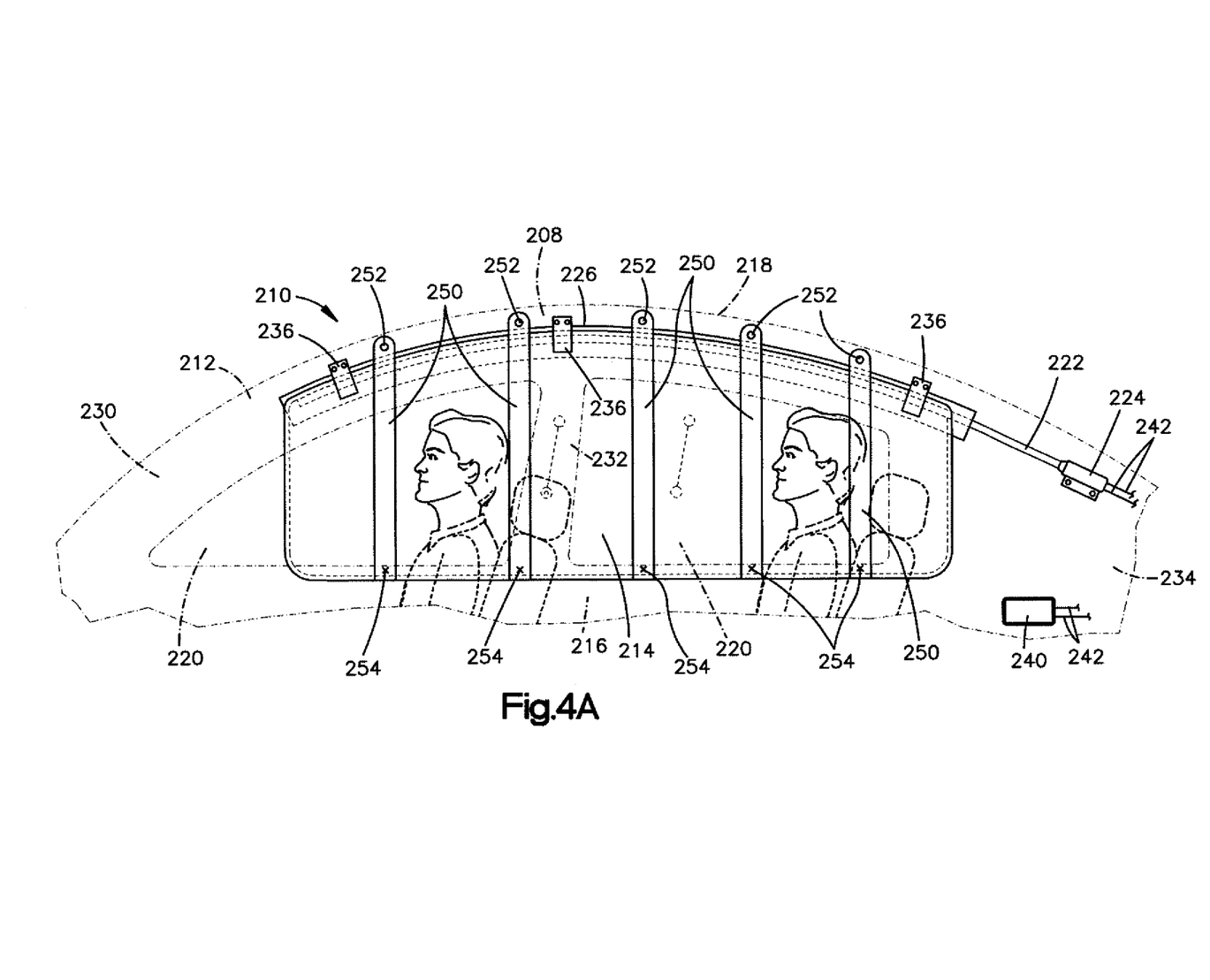
FIGS. 4A and 4B are schematic views of an apparatus for helping protect an occupant of a vehicle, according to a second embodiment of the present invention.
Figure 4B:
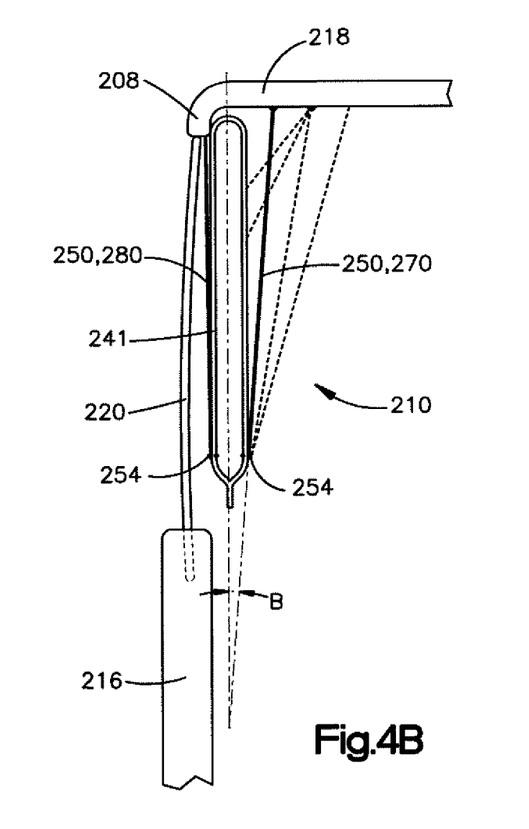

FIGS. 4A and 4B illustrate an apparatus in accordance with a second embodiment of the present invention. Referring to FIGS. 4A and 4B, the apparatus 200 includes an inflatable vehicle occupant protection device in the form of an inflatable curtain 214. The inflatable curtain 214 may be constructed with similar or identical materials configured and assembled in a similar or identical manner to those described above in reference to the air bag 14 of the embodiment of FIGS. 1-3B. The inflatable curtain 214 is mounted adjacent a side structure 216 of the vehicle 212 and a roof 218 of the vehicle. The side structure 216 of the vehicle 212 includes side windows 220, an A pillar 230, a B pillar 232, and a C pillar 234. An inflator 224 is connected in fluid communication with the inflatable curtain 214 through a fill tube 222. Alternatively, the inflator 224 could be connected directly to the inflatable curtain 214 or could be connected via a fabric fill tube or diffuser. The inflatable curtain 214, fill tube 222, and inflator 224 are connected to the vehicle 212 (ie., roof rail 208 or roof 218) by means 236, such as brackets.

The vehicle 212 includes a sensor (shown schematically at 240) for sensing the occurrence of an event for which inflation of the inflatable curtain 214 is desired, such as a side impact, a vehicle rollover, or both. Upon sensing the event, the sensor 240 provides an electrical signal over lead wires 242 to the inflator 224. The electrical signal causes the inflator 224 to be actuated in a known manner. The inflator 224 discharges fluid under pressure through fill tube 222, which directs the fluid into the inflatable curtain 214.

The inflatable curtain 214 inflates under the pressure of the inflation fluid from the inflator 224. The housing 226 opens, and the inflatable curtain 214 inflates away from the roof 218 in a downward direction as shown in the drawings and in a downward direction with respect to the direction of forward vehicle travel. In the illustrated embodiment, the inflatable curtain 214, when inflated, extends from the A pillar 230 to the C pillar 234. Those skilled in the art will appreciate that alternative configurations could be built without departing from the teachings of the present invention. For example, the inflatable curtain 14 could be configured to extend from the A pillar 230 to the B pillar 232 only or from the A pillar to a D pillar (not shown) of the vehicle 212.

The inflatable curtain 214, when inflated, is positioned between the side structure 216 of the vehicle 212 and any occupants 228 of the vehicle. The inflatable curtain 214, when inflated, helps to protect a vehicle occupant in the event of a vehicle rollover or a side impact to the vehicle 212. The inflatable curtain 214, when inflated, helps to absorb the energy of impacts with the curtain and helps to distribute the impact energy over a large area of the curtain.

As a feature of the present invention, the inflatable curtain 214 includes anti-ejection means in the form of tethers or tethers 250 that help maintain the curtain 214 positioned adjacent and covering the window opening 228 and the side structure. The tethers 250 have connections with the vehicle structure, shown schematically at 252, either directly or through a connection with the housing 226. The connections 252 may be facilitated, for example, by a bolt or other fastener or fastening structure. The tethers 250 also have connections with the inflatable curtain 214, shown schematically at 254. The connections 254 may be facilitated, for example, by stitching the tether 250 to the inflatable curtain 214 or connecting the tether to the curtain via ultrasonic welding.

The tethers 250 are configured to become tensioned upon deployment of the curtain 214. This is due to the fact that the length of the tethers 250 is selected to be shorter than the distance the portions of the curtain 214 to which the tethers are connected would travel if unencumbered by the connection with the tethers. In other words, the tethers 250 are shorter than the inflated height of the inflatable curtain 214. More particularly, the distance between the connections 252 and 254 is shorter than the inflated height of the inflatable curtain 214 as measured vertically with respect to the vehicle 212. This helps ensure that the tethers 250 become taut when the curtain 214 is pressurized. When the air bag pressurizes, it thus becomes somewhat rigid and is restrained in its deployed position by the tethers 250 while so pressurized. The curtain 214, in combination with the tethers 250, can thus help prevent an occupant or a portion of an occupant from being ejected or otherwise passing through the window opening 28.

Referring to FIG. 4B, similar to the first embodiment, the tethers 250 may include inboard tethers 270, outboard tethers 280, or a combination of inboard and outboard tethers. The tethers 250 may be connected to the vehicle via the curtain module or may be connected directly to the vehicle sheet metal, such as the roof or roof rail. The inboard tethers 270 help prevent the curtain 214 from moving in an outboard direction while inflated and pressurized. The inboard tethers 270 thus assist in providing anti-ejection qualities to the curtain 214. The outboard tethers 280 help prevent the curtain 214 from moving in an inboard direction while inflated and pressurized. The outboard tethers 280 thus assist in maintaining the position of the curtain 214 adjacent to and covering the window opening 228. In one embodiment, the outboard tethers 280 could be omitted.

As the lengths of the tethers 250 get shorter, the ejection performance of the inflatable curtain 214 improves, but at the expense of pulling the curtain further inboard of the window opening 228. Including the outboard tethers 250 additionally helps maintain the generally vertical extending position of the inflatable curtain 214. The ejection performance and inboard positioning of a particular curtain and tether combination can thus be tailored to provide desired performance characteristics.

Additionally, the tensioned tethers 250 tension the inflatable curtain 214 at angles with respect to the generally vertically deployed curtain. This angle can be selected through the configuration of the apparatus 200, examples of which are illustrated generally in dashed lines in FIG. 4B. The apparatus 200 of FIG. 4B illustrates generally at "B" the angle at which the inboard tether 270 applies tension to the inflatable curtain 214. As the angle B of FIG. 4B increases, the magnitude of the component force of the inboard tether 270 tension acting in the direction of resistance to outboard movement of the inflatable curtain 214 also increases. Thus, for a tension of a given magnitude applied to the inboard tether 270, the component of that tension that offers resistance to outboard movement of the inflatable curtain 214 will vary proportionally with the angle B.

The example tether configurations illustrated generally in dashed lined in FIG. 4B help to illustrate this point. The example inboard tether configurations illustrated generally at 270' move the connection of the tether to the vehicle inboard along the vehicle roof 218. This increases the component of the tension on the inboard tether 270' acting in the direction of resistance to outboard movement of the inflatable curtain 214. The example inboard tether configurations illustrated generally at 270" move the connection of the tether to the inflatable curtain 214 upward along the height of the curtain. This moves to a different location on the inflatable curtain 214 the application of the component of the tension on the inboard tether 270' acting in the direction of resistance to outboard movement of the inflatable curtain. One or more of these alternative examples inboard tether configurations may be implemented.

Testing has shown that the tension in the tethers 250 will limit the travel of the inflatable curtain 214 outside the window. Advantageously, the tethers 250 of the present invention can help to minimize the need for the inflatable curtain 214 to overlap with vehicle structure (such as the roof rail 218, A-pillar 230, B-pillar 232, and C-pillar 234), which can help to reduce the size of the curtain and, consequently, will reduce the size of the inflator 224. Since the inflatable curtain 214 is not relying on overlapping the vehicle structure to reduce excursion performance, curtain trajectory is not as important a factor as it otherwise might be. This can be a significant benefit in vehicles with aggressive side window angles such as sports cars.

The overlap of the inflatable curtain 214 to the trim can also be minimized as the tethers 250 will also help to absorb the load from impacts with the curtain. This can further reduce the reliance on trim overlap or tethers that extend laterally within the inflatable curtain 214 (and laterally with respect to the vehicle) to improve anti-ejection performance.

According to the present invention, in the embodiment of FIGS. 4A-4B, the tethers 250 being connected to the inflatable curtain 214 along the edge portion of the curtain opposite the location on the vehicle 212 were the curtain and the opposite end of the tether are connected helps to enhance the anti-ejection properties of the apparatus 210.

In the same manner that the air bag and tethers of FIGS. 3C and 3D envelope and restrain the occupant as described above, the tethers 250 and inflatable curtain 214 of FIGS. 4A and 4B envelope and restrain the occupant. The only difference in these two embodiments is that the inflatable curtain is deployed downward from the vehicle roof instead of upward from the vehicle door. In principle, the air bag 14 and inflatable curtain 214 provide anti-ejection performance in the same manner. When an occupant moves in the outboard direction toward the inflatable curtain 214, the occupant will impact the curtain above the lower edge of the curtain where the tethers 250 are secured via the connections 254. Since the tethers 250 and inflatable curtain 214 are connected to the vehicle at the same general location, i.e., at the vehicle roof 218, as the occupant urges the inflatable curtain 214 in the outboard direction, the tethers 250 will oppose curtain movement and the apparatus 210 provide anti-ejection performance in the same manner as the apparatus 10 of FIGS. 1-3D.

As the occupant moves outboard of the vehicle 212, the tethers 250 will oppose the outboard movement and the portion of the inflatable curtain 214 below the location where the occupant strikes the curtain will be restricted from outboard movement by the tethers. Additionally, the tethers 250 positioned fore and aft of the occupant will tend to maintain the inboard position of the fore and aft portions of the inflatable curtain 214, thus drawing the curtain around the occupant. The inflatable curtain 214 will thus envelope the occupant, in the same manner shown in FIG. 3D (except inverted). Those skilled in the art will thus appreciate that the tethers 250 will maintain the inboard positions of those portions of the inflatable curtain 214 positioned below, fore, and aft of the occupant. The inflatable curtain 214 and tethers 250, in combination, thus act to restrict outboard movement and prevent ejection of the occupant.

The configuration of the tethers 100 and 250 in the embodiments of FIGS. 1-4B can be adjusted to achieve desired performance characteristics of their respective protection devices, i.e., the air bag 14 (FIGS. 1-3B) and the inflatable curtain 214 (FIG. 4A-4B). In either instance, the effect of the tethers can be similar or identical, with differences owing to the differences in shape/configuration of the respective protection devices, and owing also to the fact that the air bag 14 (FIGS. 1-3B) deploys upward generally opposite direction of gravitational pull whereas the curtain 214 (FIGS. 4A-4B) deploys downward in generally the same direction as gravitational pull. FIGS. 5-8 illustrate different tether configurations that can be employed with a protection device that is similar or identical to either of the protection device configurations illustrated in FIGS. 1-4.

Figure 5:
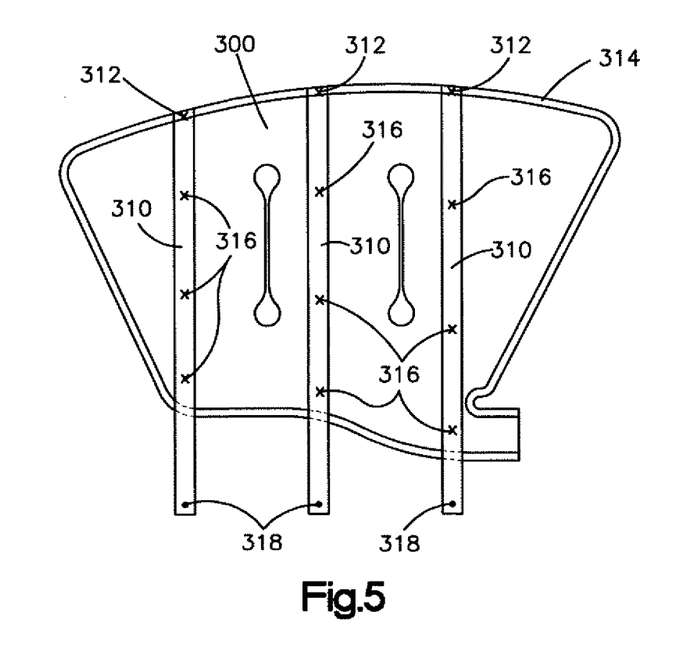
FIGS. 5-8 are schematic views illustrating the different configurations of portions of the apparatus of FIGS. 1-4.

Referring to FIG. 5, the protection device 300 includes anti-ejection means in the form of straps or tethers 310 that help maintain the protection device positioned adjacent and covering the window opening (not shown). The protection device 300 may be an air bag, such as a door mounted air bag, or a roof mounted inflatable curtain. The tethers 310 may include inboard tethers, outboard tethers, or a combination of inboard and outboard tethers. The tethers 310 are configured to become tensioned upon deployment of the protection device 300. To achieve this purpose, the length of the tethers 310 is selected to be shorter than the inflated height of the protection device 300 to help ensure that the tethers 310 become taut and tensioned when the protection device is pressurized. When the protection device pressurizes, it thus becomes somewhat rigid and is restrained in its deployed position by the tethers 310 while so pressurized. The protection device 300, in combination with the tethers 310, can thus help prevent an occupant or a portion of an occupant from being ejected or otherwise passing through the window opening.

In the embodiment of FIG. 5, the tethers 310 are relatively narrow and extend parallel to each other. The tether 310 is connected to the protection device 300 via connections 312 adjacent or near an edge 314 of the protection device. Connections 318 secure the tethers 310 to the vehicle. The tethers 312 could also be connected to the protection device 300 via connections at one or more additional locations along their respective lengths. Examples of additional locations for connections of this sort are illustrated generally at 316 in FIG. 5. The tethers 312, arranged in the example configuration of FIG. 5, thus may exert a pulling force on the protection device 300 at spaced locations along the length of the protection device and at spaced locations along the respective lengths of the tethers.

Additionally, the spacing and position of the connections 312, 316 can be tailored to achieve desired performance characteristics of the protection device 300. For example, inboard tethers 310 may have multiple connections 312, 316 with the protection device 300 to maintain the inboard position of the protection device. In this configuration, outboard tethers 310 may have fewer connections with the protection device, such as a sole connection 312 along the edge 314 of the protection device, to maintain the window opening covering position of the protection device. Similar to the embodiments of FIGS. 1-4B, the angle at which inboard tethers 310 extend relative to the protection device 300 can be selected to help configure or adjust the resistance force to outboard movement of the protection device.

Figure 6:
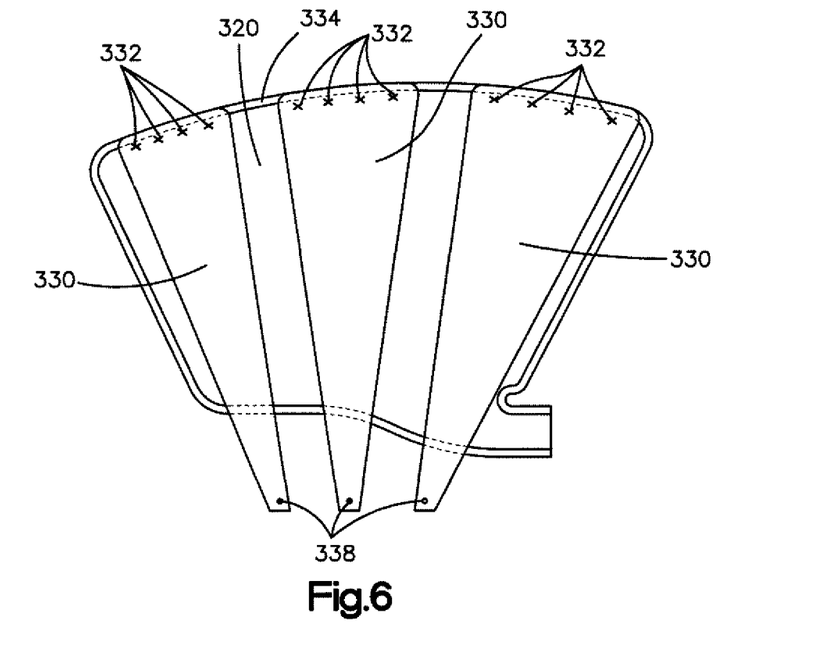

Referring to FIG. 6, the protection device 320 includes anti-ejection means in the form of straps or tethers 330 that help maintain the protection device positioned adjacent and covering the window opening (not shown). The protection device 320 may be an air bag, such as a door mounted air bag, or a roof mounted inflatable curtain. The tethers 330 may include inboard tethers, outboard tethers, or a combination of inboard and outboard tethers.

The tethers 330 are configured to become tensioned upon deployment of the protection device 320. To achieve this purpose, the length of the tethers 330 is selected to be shorter than the inflated height of the protection device 320 to help ensure that the tethers 330 become taut and tensioned when the protection device is pressurized. When the protection device pressurizes, it thus becomes somewhat rigid and is restrained in its deployed position by the tethers 330 while so pressurized. Additionally, similar to the embodiments of FIGS. 1-5, the angle at which inboard tethers 330 extend relative to the protection device 320 can be selected to help configure or adjust the resistance force to outboard movement of the protection device. The protection device 320, in combination with the tethers 330, can thus help prevent an occupant or a portion of an occupant from being ejected or otherwise passing through the window opening.

In the embodiment of FIG. 6, the tethers 330 have tapered configurations in which the portions of the tethers adjacent the edge 334 of the protection device 320 are widened. The tethers 330 taper down away from the edge 334 toward their opposite ends. The tether 330 is connected to the protection device 320 via connections 332 at or near the wide end near the edge 334 of the protection device. Although illustrated as a series of spaced individual connections 332, the connections 332 may, as an example, comprise a single continuous stitch line. Connections 338 at or near the narrow ends secure the tethers 330 to the vehicle. The tethers 332 could also be connected to the protection device 320 via connections at one or more additional locations along their respective lengths.

The tapered configurations of the tethers 330 may help provide a desired degree of control over deployment of the protection device 320. The tethers 330, being connected to the protection device 320 along an increased portion of the length of the edge 334, may help spread the tension forces more evenly along the length of the protection device.

Additionally, as shown in the embodiment of FIG. 6, the protection device 320 itself may have a somewhat tapered configurations with end portions that extend angularly toward each other. The taper of the tethers 330 is similar to the taper of the protection device. Therefore, the tethers 330, although tapered, cover a substantial portion of the protection device 320. The forces exerted on the protection device 320 by the tethers 330 may thus be spread out more evenly across the area of the protection device. This may be beneficial in avoiding the protection device 320 bulging out between the tethers 330 and being constricted in the areas of the tethers. The protection device 320 may thus maintain a more uniform thickness along its length while benefitting from the anti-ejection properties provided by the tethers 330.

Figure 7:
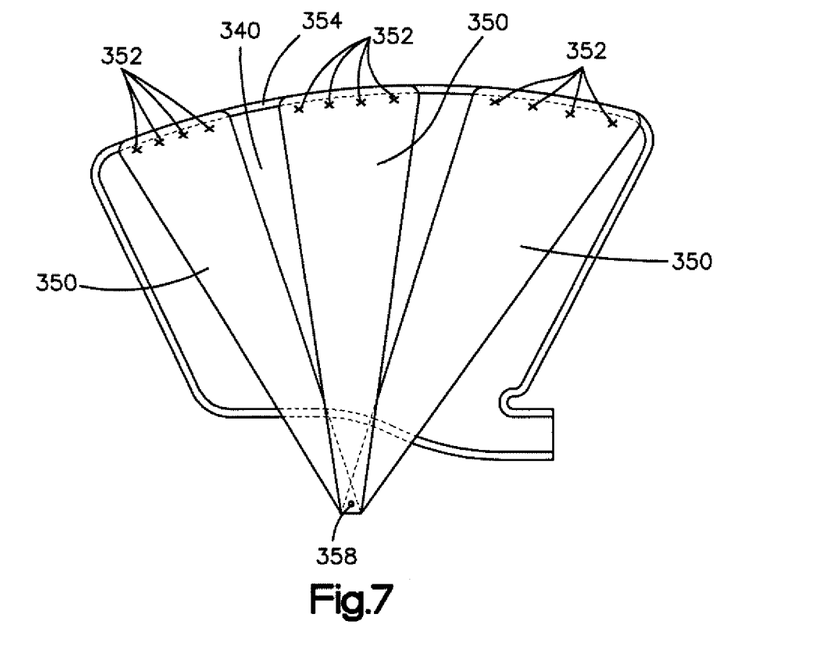

In the embodiment of FIG. 7, the tethers 350 have tapered configurations similar or identical to those illustrated in the embodiment of FIG. 6, in which the portions of the tethers adjacent the edge 354 of the protection device 340 are widened. The tethers 350 taper down away from the edge 354 toward their opposite ends. The tether 350 is connected to the protection device 340 via connections 352 at or near the wide end near the edge 354 of the protection device. Although illustrated as a series of spaced individual connections 352, the connections 352 may, as an example, comprise a single continuous stitch line. In the embodiment of FIG. 7, the narrow ends of the tethers 350 are secured to the vehicle at a single connection 358. The tethers 352 could also be connected to the protection device 340 via connections at one or more additional locations along their respective lengths.

The tapered configurations of the tethers 350 may help provide a desired degree of control over deployment of the protection device 340. The tethers 350, being connected to the protection device 340 along an increased portion of the length of the edge 354, may help spread the tension forces more evenly along the length of the protection device. Similar to the embodiments of FIGS. 1-6, the angle at which inboard tethers 350 extend relative to the protection device 340 can be selected to help configure or adjust the resistance force to outboard movement of the protection device.

Additionally, as shown in the embodiment of FIG. 7, the protection device 340 itself may have a somewhat tapered configurations with end portions that extend angularly toward each other. The taper of the tethers 350 is similar to the taper of the protection device. Therefore, the tethers 350, although tapered, cover a substantial portion of the protection device 340. The forces exerted on the protection device 340 by the tethers 350 may thus be spread out more evenly across the area of the protection device. This may be beneficial in avoiding the protection device 340 bulging out between the tethers 350 and being constricted in the areas of the tethers. The protection device 340 may thus maintain a more uniform thickness along its length while benefitting from the anti-ejection properties provided by the tethers 350.

The central point of connection 358 of the tethers 350 to the vehicle may help adapt or configure deployment of the protection device 340. This central connection may help maintain the opposite ends in a desired position with respect to the window opening. The connection 358, being central to the protection device 340, may be configured to exert forward and rearward components of tension force on the rearward and forward ends, respectively, of the protection device. This may be desirable, for example, to counter forward or rearward occupant ejection trajectories resulting, for instance, from corresponding forward or rearward vehicle travel at the time of the event producing the ejection scenario. This may also be desirable to help configure or shape the protection device 340 to have a desired profile. This can be done, for example, by adjusting the respective lengths of the tethers 350, the locations of the tethers' connections with the protection device 340, and the location of the connection(s) with the vehicle.

Figure 8:
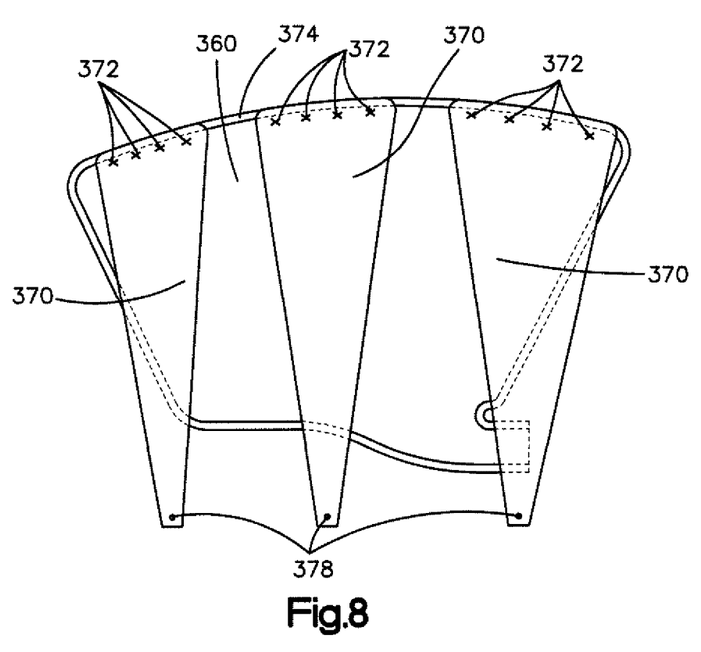

In the embodiment of FIG. 8, the tethers 370 have tapered configurations similar or identical to the tapered tethers illustrated in the embodiments of FIGS. 6 and 7, in which the portions of the tethers adjacent the edge 374 of the protection device 360 are widened. The tethers 370 taper down away from the edge 374 toward their opposite ends. The tether 370 is connected to the protection device 360 via connections 372 at or near the wide end near the edge 374 of the protection device. Although illustrated as a series of spaced individual connections 372, the connections 372 may, as an example, comprise a single continuous stitch line. In the embodiment of FIG. 8, the narrow ends of the tethers 370 are secured to the vehicle at a connection 378 positioned approximately vertically below the center of the widened end. The tethers 370 of FIG. 8 thus effectively replace the narrow tethers of the embodiment of FIG. 5 with the illustrated tapered tethers.

The tapered configurations of the tethers 370 may help provide a desired degree of control over deployment of the protection device 360. The tethers 370, being connected to the protection device 360 along an increased portion of the length of the edge 374, may help spread the tension forces more evenly along the length of the protection device. Similar to the embodiments of FIGS. 1-7, the angle at which inboard tethers 370 extend relative to the protection device 360 can be selected to help configure or adjust the resistance force to outboard movement of the protection device.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle that has a side structure and a window opening adjacent to a vehicle seat, the apparatus comprising:
    an inflatable vehicle occupant protection device inflatable to a deployed condition in which the protection device is positioned between the side structure and the vehicle seat and covers at least a portion of the window opening, the protection device when in the deployed condition having a first edge portion connected to an adjacent portion of the vehicle and an opposite second edge portion that is free from connections to vehicle portions adjacent the second edge portion; and
    at least one tether having a first end connected to the vehicle proximate to the first edge portion of the protection device and an opposite second end connected to the second edge portion of the protection device, the at least one tether maintaining the second edge portion of the protection device in the deployed condition, the at least one tether being adapted to resist outboard movement of the second edge portion through the window opening in response to being urged toward the window opening by an outboard moving object,
    wherein the at least one tether comprises a first tether connected to the second edge portion at a location forward of a vehicle seating position, and a second tether connected to the second edge portion at a location rearward of the vehicle seating position, the first and second tethers extending inboard of the protection device and being adapted to draw in the second edge portion fore and aft of the seating position in response to the outboard movement of an object into engagement with the protection device, the protection device being adapted to envelope and restrain the object from ejection through the window opening.

2. The apparatus recited in claim 1, wherein the at least one tether extends inboard of the protection device.

3. The apparatus recited in claim 1, wherein the at least one tether is connected to the protection device at a plurality of locations along the length of the at least one tether.

4. An apparatus for helping to protect an occupant of a vehicle that has a side structure and a window opening adjacent to a vehicle seat, the apparatus comprising:
    an inflatable vehicle occupant protection device inflatable to a deployed condition in which the protection device is positioned between the side structure and the vehicle seat and covers at least a portion of the window opening, the protection device when in the deployed condition having a first edge portion connected to an adjacent portion of the vehicle and an opposite second edge portion that is free from connections to vehicle portions adjacent the second edge portion; and
    at least one tether having a first end connected to the vehicle proximate to the first edge portion of the protection device and an opposite second end connected to the second edge portion of the protection device, the at least one tether maintaining the second edge portion of the protection device in the deployed condition, the at least one tether being adapted to resist outboard movement of the second edge portion through the window opening in response to being urged toward the window opening by an outboard moving object, wherein the at least one tether comprises a plurality of tethers configured to be tensioned in generally parallel directions due to pressurization of the protection device when in the deployed condition.

5. The apparatus recited in claim 4, wherein the at least one tether comprises a plurality of tethers configured to be tensioned at acute angles relative to each other due to pressurization of the protection device.

6. The apparatus recited in claim 4, wherein the first end of the at least one tether is connected to the vehicle at a location inboard of the location where the first edge portion of the protection device is connected to the vehicle.

7. The apparatus recited in claim 6, wherein the at least one tether is positioned to extend inboard of an inboard facing panel of the protection device, the at least one tether resisting outboard movement of the protection device in response to the object moving in an outboard direction into engagement with the protection device, the at least one tether thereby restraining the object from ejection through the window opening.

8. The apparatus recited in claim 4, wherein the at least one tether comprises at least one inboard tether positioned inboard of an inboard facing panel of the protection device, and at least one outboard tether positioned outboard of an outboard facing panel of the protection device, the inboard and outboard tethers restraining outboard and inboard movement, respectively, of the protection device when in the deployed condition.

9. The apparatus recited in claim 1, wherein the at least one tether has a length that is shorter than the height of the protection device in the deployed condition.

10. The apparatus recited in claim 1, wherein the at least one tether has a tapered configuration wherein the second end portion has a width that is greater than a width of the first end portion, the width of the at least one tether tapering down from the second end portion to the first end portion.

11. The apparatus recited in claim 1, wherein the first end portions of the at least one tether are connected to the vehicle at a common location.

12. An apparatus for helping to protect an occupant of a vehicle that has a side structure and a window opening adjacent to a vehicle seat, the apparatus comprising:
   an inflatable vehicle occupant protection device inflatable to a deployed condition in which the protection device is positioned between the side structure and the vehicle seat and covers at least a portion of the window opening, the protection device when in the deployed condition having a first edge portion connected to an adjacent portion of the vehicle and an opposite second edge portion that is free from connections to vehicle portions adjacent the second edge portion; and
   at least one tether having a first end connected to the vehicle proximate to the first edge portion of the protection device and an opposite second end connected to the second edge portion of the protection device, the at least one tether maintaining the second edge portion of the protection device in the deployed condition, the at least one tether being adapted to resist outboard movement of the second edge portion through the window opening in response to being urged toward the window opening by an outboard moving object, wherein the protection device comprises a side impact air bag having a stored condition in a side door of the vehicle and being deployable upward from the stored condition to the deployed condition, and wherein the first edge portion comprises a lower edge portion of the air bag connected to the vehicle door, the first end of the at least one tether being connected to the vehicle door at a location inboard of the lower edge portion, the second end of the at least one tether being connected to an upper edge portion of the air bag opposite the lower edge portion.

13. The apparatus recited in claim 12, wherein the at least one tether comprises first and second tethers having first ends connected to the vehicle door, the first tether having a second end connected to an upper edge portion of the air bag at a location forward of the vehicle occupant, the second tether having a second end connected to the upper edge portion of the air bag at a location rearward of the vehicle occupant, the first and second tethers extending inboard of the air bag and in response to the occupant moving outboard into engagement with the air bag drawing in the upper edge portion fore and aft of the occupant so that the air bag envelopes the occupant and restrains the occupant from ejection through the window opening.

14. The apparatus recited in claim 12, wherein the first end of the at least one tether is connected to the vehicle door at a location inboard of the air bag, and the second end of the at least one tether is connected to an upper edge portion of the air bag, the at least one tether being configured to restrain outboard movement of the air bag so that the upper edge portion envelopes an outboard moving object and restrains the object from ejection through the window opening.

15. The apparatus recited in claim 1, wherein the protection device comprises an inflatable curtain having a stored condition adjacent a roof of the vehicle and being deployable downward from the stored condition to the deployed condition.

16. The apparatus recited in claim 15, wherein the first edge portion comprises an upper edge portion of the inflatable curtain connected to the vehicle roof, the first end of the at least one tether being connected to the vehicle roof at a location inboard of the upper edge portion, the second end of the at least one tether being connected to a lower edge portion of the inflatable curtain opposite the upper edge portion.

17. The apparatus recited in claim 15, wherein the at least one tether comprises first and second tethers having first ends connected to the vehicle roof, the first tether having a second end connected to a lower edge portion of the inflatable curtain at a location forward of the vehicle occupant, the second tether having a second end connected to the lower edge portion of the inflatable curtain at a location rearward of the vehicle occupant, the first and second tethers extending inboard of the inflatable curtain and in response to the occupant moving outboard into engagement with the inflatable curtain drawing in the lower edge portion fore and aft of the occupant so that the inflatable curtain envelopes the occupant and restrains the occupant from ejection through the window opening.

18. The apparatus recited in claim 15, wherein the first end of the at least one tether is connected to the vehicle roof at a location inboard of the inflatable curtain, and the second end of the at least one tether is connected to a lower edge portion of the inflatable curtain, the at least one tether being configured to restrain outboard movement of the inflatable curtain so that the lower edge portion envelopes an outboard moving occupant and restrains the occupant from ejection through the window opening.

19. An apparatus for helping to protect an occupant of a vehicle that has a side structure and a door that helps define a window opening, the apparatus comprising:
   an air bag stored in the door and being inflatable upward to a deployed condition in which the air bag is positioned between the side structure and a vehicle occupant position and covers at least a portion of the window opening, the air bag having a lower edge portion connected to the vehicle door and an opposite upper edge portion; and
   at least one tether having a first end connected to the door proximate to and inboard of the lower edge portion of the air bag, and an opposite second end connected to the upper edge portion of the air bag, the at least one tether extending inboard of an inboard facing panel of the air bag, the at least one tether maintaining the upper edge portion of the air bag in the deployed condition and being adapted to resist outboard movement of the upper end portion through the window opening in response to being urged toward the window opening and thereby being adapted to restrain the occupant from ejection through the window opening.

20. The apparatus recited in claim 19, wherein the at least one tether comprises a first tether connected to the upper edge portion at a location forward of a vehicle occupant position, and a second tether connected to the upper edge portion at a location rearward of the vehicle occupant position, the first and second tethers being adapted to draw in the upper edge portion fore and aft of the occupant position in response to outboard movement into engagement with the air bag, the air bag being adapted to envelope and restrain the occupant from ejection through the window opening.

21. The apparatus recited in claim 19, wherein the at least one tether has a tapered configuration, the first end being narrowed and the second end being widened, the at least one tether tapering down from wide to narrow from the second end to the first end.

\* \* \* \* \*